United States Patent
Lo et al.

(12) 
(10) Patent No.: US 6,633,791 B1
(45) Date of Patent: Oct. 14, 2003

(54) DISPATCHING SYSTEM WITH DYNAMICALLY FORWARD LOADING (DFL) INTENSITY TO SOLVE NONLINEAR WAFER OUT PROBLEM

(75) Inventors: Chiang-Chou Lo, Hsin Chu (TW); Fang-Jen Hsu, Hsin Chu (TW); Chao-Yu Hsieh, Hsin Chu (TW); Hsing-Chung Lin, Tao-Yuan (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 0 days.

(21) Appl. No.: 09/428,574

(22) Filed: Oct. 28, 1999

(51) Int. Cl.⁷ .............................................. G06F 19/00
(52) U.S. Cl. ............................ 700/101; 700/100; 705/8
(58) Field of Search ............................... 700/13, 14, 28, 700/32, 46, 100–103, 108, 121; 705/8

(56) References Cited

U.S. PATENT DOCUMENTS

| | | | | |
|---|---|---|---|---|
| 3,703,725 A | * | 11/1972 | Gomersall et al. | 198/358 |
| 5,396,432 A | | 3/1995 | Saka et al. | 364/468 |
| 5,446,671 A | * | 8/1995 | Weaver et al. | 700/100 |
| 5,612,886 A | * | 3/1997 | Weng | 700/101 |
| 5,721,686 A | * | 2/1998 | Shahraray et al. | 700/102 |
| 5,748,478 A | * | 5/1998 | Pan et al. | 700/101 |
| 5,751,580 A | | 5/1998 | Chi | 700/101 |
| 5,768,133 A | | 6/1998 | Chen et al. | 700/95 |
| 5,818,716 A | | 10/1998 | Chin et al. | 700/100 |
| 5,826,238 A | | 10/1998 | Chen et al. | 705/8 |
| 5,838,565 A | * | 11/1998 | Hsieh et al. | 700/100 |
| 5,880,960 A | * | 3/1999 | Lin et al. | 700/99 |
| 5,889,673 A | * | 3/1999 | Pan et al. | 700/101 |

OTHER PUBLICATIONS

Lozinski et al., "Bottleneck Starvation Indicators for Shop Floor Control," IEEE Transactions on Semiconductor Manufacturing, vol. 1, No. 4, Nov, 1988, pp. 147–153.

* cited by examiner

*Primary Examiner*—Maria N. Von Buhr
*Assistant Examiner*—Paul Rodriguez
(74) *Attorney, Agent, or Firm*—George O. Saile; Stephen B. Ackerman; Graham S. Jones, II

(57) ABSTRACT

Calculate the $WIP_i$ for a stage $ST^{kk}$ for each lot Li in a queue of lots being processed in a production line between the stage $ST^{kk}$ and an end point, where "i" is a positive integer representing the position of the lot Li in the queue, and where "kk" is a positive integer indicating the sequential position of the stage $ST^{kk}$ (location along the production line) from the beginning to the end of a predetermined portion of the production line. Calculate remaining scheduled cycle time ($RCT_i$) for each lot Li. Calculate consumed scheduled cycle time ($CST_i$) for each lot Li. Calculate ($WIP_i*RCT_i$) for each lot Li. Calculate ($WIP_i*CST_i$) for each lot Li. Sum $WIP_i*RCT_i$ for all lots Li of a stage. Sum $WIP_i*CST$ for all lots Li of a stage. Calculate the Index of Dynamic Forward Loading Intensity ($I_{DFL}$) for each stage $ST^{kk}$ by dividing the (Sum $WIP_i*RCT_i$, for all lots of the stage) by the (Sum $WIP_i*CST_i$, for all lots of the stage) where kk is a positive integer indicating the location of the stage from the beginning to the end of the production line. Adjust the dispatching order of lots based on the rankings of the stages of the production $I_{DFL}$ line, with lowest $I_{DFL}$ ratings having priority.

7 Claims, 6 Drawing Sheets

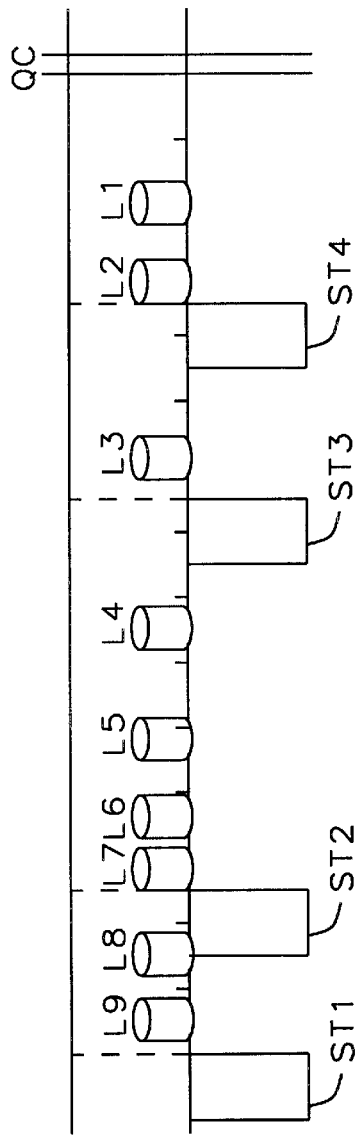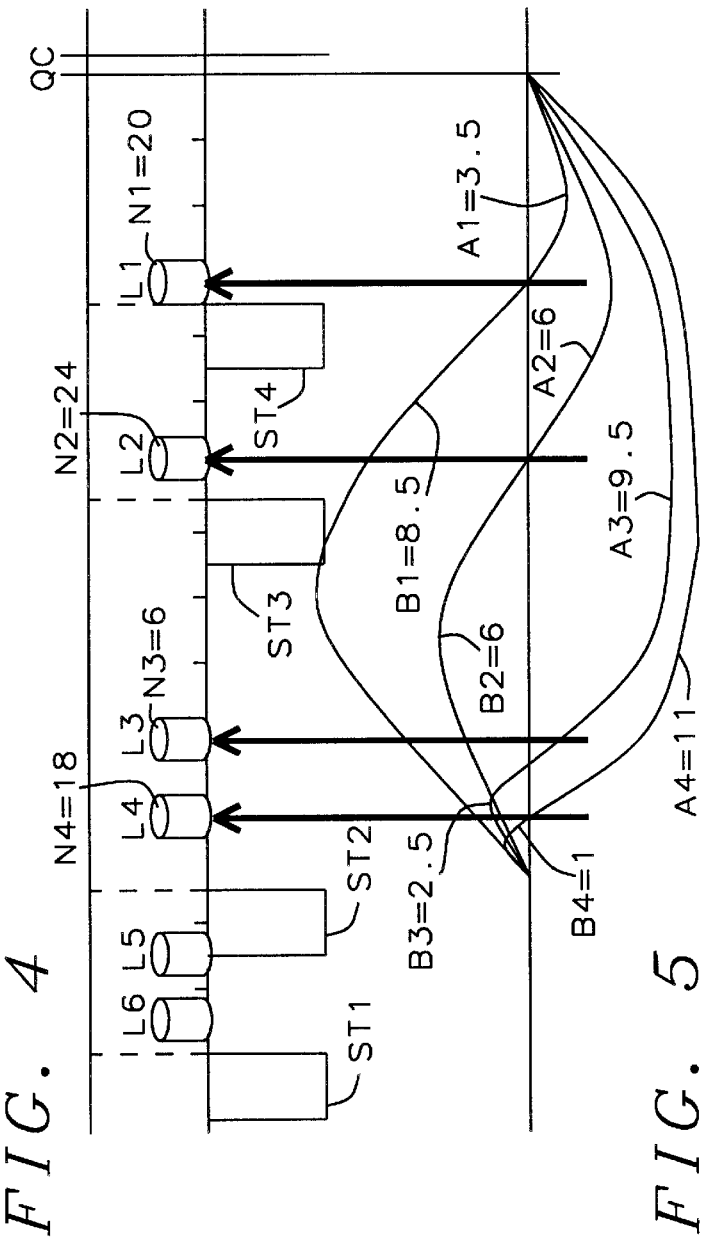

DISPATCHING SYSTEM WITH DYNAMICALLY FORWARD LOADING (DFL) INTENSITY TO SOLVE NONLINEAR WAFER OUT PROBLEM

BACKGROUND OF THE INVENTION

1. Field of the Invention

This invention relates to systems for controlling work flow in a manufacturing plant and more particularly to dispatching systems therefor.

2. Description of Related Art

Since the product mix and the process technology are complicated in a foundry comprising a semiconductor fabrication plant, different technologies are employed in different stages of the plant. Some of those stages can employ the same types of machines, i.e. equipment, for processing. Because of several factors, WIP (Work In Process) can easily pile up in a particular area on an occasional basis. For example, when one or more of the machines, in one or more of the stages, becomes unstable or where there is a resource arrangement bias that causes the production line to deteriorate into a non-linear status, losses result which comprise reduced wafer movement, increased cycle time, and delayed wafer delivery.

"Bottleneck Starvation Indicators for Shop Floor Control" IEEE TRANSACTIONS ON SEMICONDUCTOR MANUFACTURING; VOL. 1., No. 1, (FEBRUARY 1988) pages, 147–153.

U.S. Pat. No. 5,396,432 of Saka et al. shows a production system and method of operating thereof.

U.S. Pat. No. 5,751,580 of Chi describes a fuzzy logic method and system for adjustment of priority rating of WIP in a production line.

U.S. Pat. No. 5,768,133 of Chen et al., which is commonly assigned, shows a WIP/Move management tool for a semiconductor manufacturing plant and a method of operation thereof.

U.S. Pat. No. 5,818,716, that is commonly assigned, of Chin et al. describes a dynamic lot dispatching required turn rate factory control system and a method of operation thereof for a semiconductor plant.

U.S. Pat. No. 5,826,238 of Chen et al., which is also commonly assigned, describes a method and a system for a daily target generation and machine allocation with priority.

SUMMARY OF THE INVENTION

Characteristics influencing the distribution of WIP are as follows: 1. variable product type; 2. manpower arrangement; 3. machine available time; and 4. dispatching Indexes that are driven by dispatching of lot of work are as follows: 1. cycle time; 2. OTD (on-time delivery); and 3. wafer movement

Index of Dynamic Forward Loading ($I_{DFL}$)

1. Using the Lever Principle, the remaining cycle time and consumed cycle time are used to generate the "Dynamically Forward Loading (DFL) Index ($I_{DFL}$). The Intensity of the DFL Index ($I_{DFL}$) is referred to as "α". There is a judgement factor used in making decisions pertaining to dispatching which is enhanced by use of α and $I_{DFL}$.

According to the "lever principle", a lever is in a state of balance when the product of the right side force multiplied by the right side torque arm equals the left side force multiplied by the left side torque arm. Using an analogy to the "lever principle" and referring to FIG. 5, the elements are as follows:

Fulcrum of lever=Each specific lot/set of lots.

Force applied to right side Wafer quantity of each specific lot/set of lots.

Right side torque arm=Remaining scheduled cycle time counting back from the last stage, i.e. the QC-stage, to the current lot stage.

For example, referring again to FIG. 5, let us assume that there are two (2) lots remaining in production on the line. Those lots are L3 and L4. Let us use a predefined comparison at stage ST2. The fulcrum of the lever separates the right and left sides=L3+L4.

A=Force applied to the right side=wafer quantity of sets of lots L3+L4

B=Right side torque arm=Remaining scheduled cycle time counting from QC-stage to current lots L3+L4

C=Force applied to left side=wafer quantity of sets of lots L3+L4

D=Left side torque arm=Consumed scheduled cycle time counting from stage ST2 to current L3 and L4 stages Thus, when $$\frac{(A \times B)}{(C \times D)} = 1,$$

the production system is balanced.

2. The $I_{DFL}$ Index immediately indicates any production dispatching bias caused by a factor such as an unstable machine or an inefficient deployment of manpower at each stage which would influence the scheduling and efficiency of the other stages in the manufacturing line.

A computer operated method is employed for determining the rate of dispatching lots for a stage on a production line. First, determine the weighted loading of work for each of the lots between the stage and a succeeding location on the production line by calculating a ratio of weighted progress of the lots as a product of time from dispatching of each lot and as a product of time to completion for each lot to produce an index for the stage. Then, adjust the rate of dispatching of the lots as a function of the Index.

In accordance with this invention the computer system calculates the $WIP_i$ for a stage $ST^{kk}$ for each lot Li in a queue of lots being processed in a production line between the stage $ST^{kk}$ and end point, where "i" is a positive integer representing the position of the lot Li in the queue, and where "kk" is a positive integer indicating the sequential position of the stage $ST^{kk}$ (location along the production line) from the beginning to the end of a predetermined portion of the production line. Calculate remaining scheduled cycle time ($RCT_i$) for each lot Li. Calculate consumed scheduled cycle time ($CST_i$) for each lot Li. Calculate ($WIP_i*RCT_i$) for each lot Li. Then, calculate ($WIP*CST_i$) for each lot Li. Sum $WIP_i*RCT_i$ for all lots Li of a stage. Sum $WIP_i*CST$ for all lots Li of a stage. Calculate the Index of Dynamic Forward Loading Intensity ($I_{DFL}$) for each stage $ST^{kk}$ by dividing the (Sum $WIP_i*RCT_i$, for all lots of the stage) by the (Sum $WIP_i*CST_i$, for all lots of the stage) where kk is a positive integer indicating the location of the stage from the beginning to the end of the production line. Adjust the dispatching order of lots based on the rankings of the stages of the production $I_{DFL}$ line, with lowest $I_{DFL}$ ratings having priority.

BRIEF DESCRIPTION OF THE DRAWINGS

The foregoing and other aspects and advantages of this invention are explained and described below with reference to the accompanying drawings, in which:

FIG. 4 shows a fabrication line with four stages $ST^{kk}$ where kk=1, 2, 3 and 4.

FIG. 5 shows the implementation of Dynamic Forward Loading Intensity to the fabrication line of FIG. 4 with the same arrangement of four stages in the same locations as in FIG. 4, but with a different arrangement of the WIP which includes six lots.

DESCRIPTION OF THE PREFERRED EMBODIMENT

The dispatching system of this invention provides Dynamic Forward Loading Intensity.
1. This system improves balance of the work load on the production line, while at the same time it prevents WIP (Work In Process) from piling up in some particular area on the production line, to achieve a linear rate of wafer output of the production line.
2 This system raises the resource (machine capacity) utilization and while it concomitantly reduces the cycle time.
3. This system raises the OTD (On Time Delivery) performance.

A Single Lot

Figure 1:
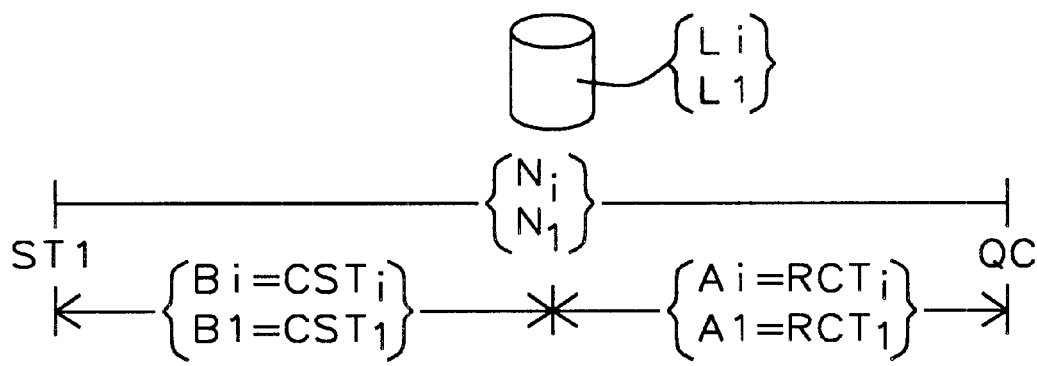
FIG. 1 is an elementary schematic diagram of example of some of the factors involved in the system of this invention with a production line with a single stage and a single lot of work.

FIG. 1 is an elementary schematic diagram of example of some factors involved in the system of this invention with a production line with a single stage and a single lot of work, e.g semiconductor wafers. The production line begins at first stage ST1 and ends at station QC. Single lot L1 is located between the first stage ST1 and the production line end QC. The Consumed Scheduled cycle Time (CST) B1 is marked between the current location and the Remaining scheduled Cycle Time (RCT) A1.

To generalize the diagram shown in FIG. 1, lot L1 on the production line is also referred to a Li where "i" is a positive integer applied to each stage of the line. In this case the lot is lot "1", so i=1. The symbol $N_i$ represents the number of wafers in lot "i" and in this case the specific symbol for $N_i$ when i=1 is $N_1$. The value $B_i=CST_i$ represents the time Consumed Scheduled cycle Time (CST) for the lot Li to reach the location shown in FIG. 1 is which in this case is $B_1=CST_1$. The value $A_i=RCT_i$ represents the time Remaining scheduled Cycle Time (RCT) for the lot Li to go from the location shown in FIG. 1 to the end of the line QC, which in this case is $A_1=RCT_1$.

Figure 2:
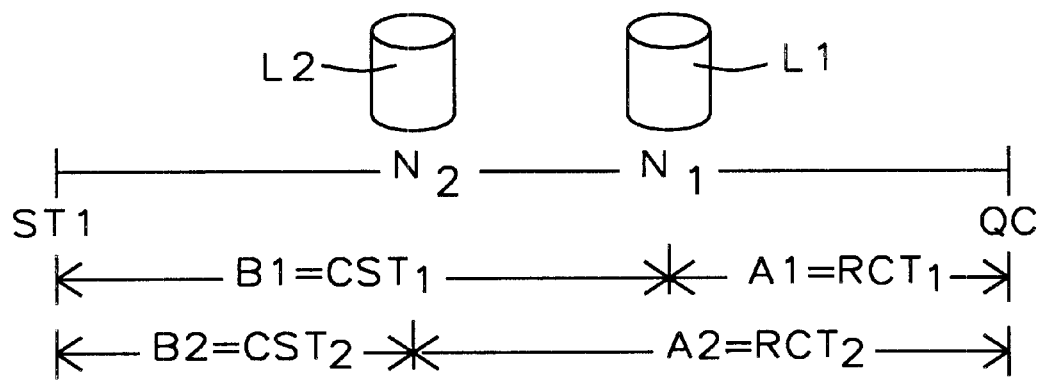
FIG. 2 shows a schematic diagram of the kind shown in FIG. 1 with a single stage and two lots of semiconductor wafers on a semiconductor production line.

FIG. 2 shows a schematic diagram of the kind shown in FIG. 1 with a single stage and two lots of semiconductor wafers on a semiconductor production line. In FIG. 2, two lots L1 and L2 included quantities of $N_1$ and $N_2$ wafers each. Lot L2 is closer to stage ST1 because it was dispatched later than lot L1 which is closer to the end of the line QC. Thus the Consumed Scheduled cycle Time (CST) B1 of $CST_1$ for lot L1 is larger than the Consumed Scheduled cycle Time $B2=CST_2$ for lot L2. By the same token Remaining scheduled Cycle Time (RCT) $A1=RCT_1$ for lot L1 is smaller than the Remaining scheduled Cycle Time $A2=RCT_2$ for lot L2.

The $I_{DFL}$ Index (named the Index of Dynamic Forward Loading Intensity) is calculated based on the following:
1) Each stage along a production line has a Scheduled Cycle Time (SCT) which represents the time required to travel from the current stage to the last stage QC known as "QC-INSP".
2) Every lot "i" below the last stage has two separate periods, i,e. the stage period has two (2) sections which are 1) finished with a Consumed Scheduled cycle Time (CST) "$B_i$," and 2) unfinished: Remaining Scheduled Cycle (RSC) time "$A_i$".
3) The $I_{DFL}$ Index of a stage is calculated as a summation of the products of {the unfinished or Remaining Scheduled Cycle time period ($RCT_i$) of each lot "i"} times {the wafer quantity for the lot "i"} divided by the product of the {finished or Consumed Scheduled cycle Time period ($CST_i$) of lots "i"} times {the wafer quantity for the lot "i"}.

Physical Meaning of Value of "$I_{DFL}$"

$I_{DFL} > 1$: Lots for Stage $ST^{kk}$ are overloading below stage $ST^{kk}$, so the flow rate should be decreased to be slower beyond stage $ST^{kk}$. Thus lots should be pushed out from stage $ST^{kk}$ slowly, where kk is a positive integer indicating the sequential position of the stage $ST^{kk}$ (location along the production line) from the beginning to the end of a predetermined portion of the production line. Usually, the predetermined portion would include the entire production line.

$I_{DFL}=1$: Line is balanced below stage $ST^{kk}$, which is the ideal situation being pursued by this invention.

$I_{DFL}<1$: Too few lots are loading below stage $ST^{kk}$, so the flow rate should be increased to be faster beyond stage $ST^{kk}$. In this case the wafers (lots) should be pushed out from the stage $ST^{kk}$ more rapidly.

In any case the number of lots being pushed out from the stage $ST^{kk}$ should be controlled accordingly.

Below is the formula for calculating the $I_{DFL}$ Index in accordance with the above paragraph for Stage STkk and lots Li.

$$I_{DFL} = \frac{\sum_{i=1}^{n} WIP_i * RCT_i}{\sum_{i=1}^{n} WIP_i * CST_i} \quad (1)$$

Li=Lot "i"
i=1, 2 . . . n, where n is the number of the lot Li
$WIP_i$=wafer quantity of lot i
$RCT_i$=Remaining scheduled Cycle Time for lot i
$CST_i$=Consumed Scheduled Cycle Time for lot i
i=1, 2 . . . n, where n is the number of the lot Note that each product has a Scheduled Cycle Time (SCT) defined for each FAB (FABrication plant).

Figure 3A:
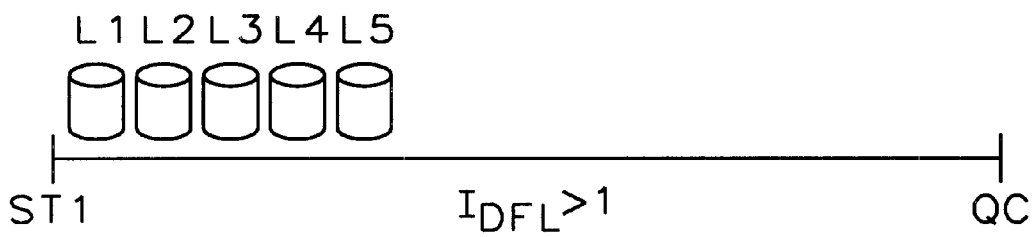
FIG. 3A shows five lots all of which are at or near the first stage of a hypothetical production line and thus $I_{DFL} \gg 1$.

In FIG. 3A, five lots L1 to L5 are all at or near the first stage ST1 of a hypothetical production line. The values of $CST_i$ for the lots L1 to L5 are very small and the values of $RCT_i$ are large so assuming all values of wafer quantities $WIP_i$ are identical, the ratios of $RCT_i$ to $CST_i$ are all very large and thus $I_{DFL} \gg 1$.

Figure 3B:
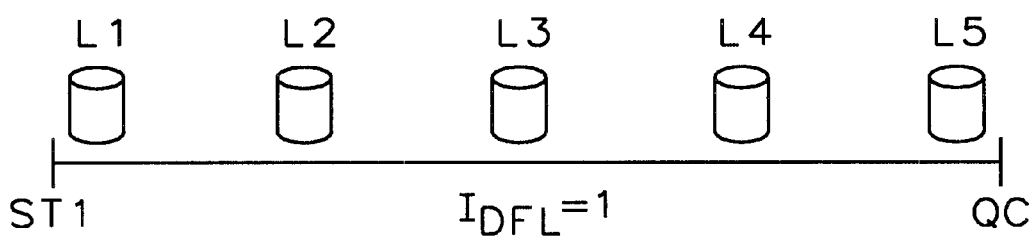
In FIG. 3B, the five lots of FIG. 3A are distributed equally along the line between the first stage and the end of the hypothetical production line, so $I_{DFL}=1$.

In FIG. 3B, the five lots L1 to L5 are distributed equally along the line between the first stage ST1 and the end of the hypothetical production line QC. Thus, again assuming all values of wafer quantities $WIP_i$ are identical, and the values of $RCT_i$ and $CST_i$ are equally balanced, roughly as shown, then $I_{DFL} = 1$.

Figure 3C:
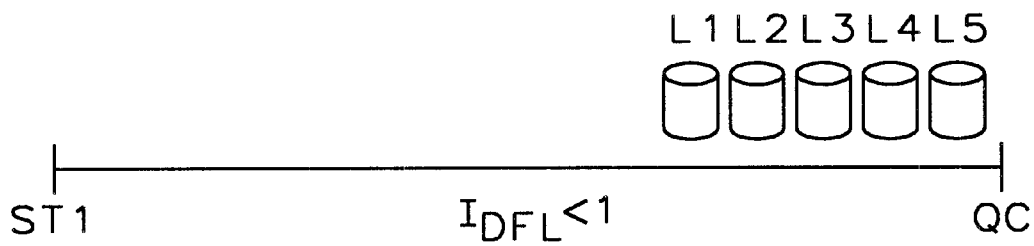
In FIG. 3C, the five lots of FIG. 3A are all at or near the end of the hypothetical production line and thus $I_{DFL} \ll 1$.

In FIG. 3C, the five lots L1 to L5 are all at or near the end of the line QC of the hypothetical production line. The values of $CST_i$ for the lots L1 to L5 are very large and the values of $RCT_i$ are small, so assuming all values of wafer quantities $WIP_i$ are identical, the ratios of $RCT_i$ to $CST_i$ are all very small and thus $I_{DFL} \ll 1$.

At a given time and at a given stage on the production line, there may be many lots comprising WIP distributed along the production line. Thus, we sum up for all of those lots the Remaining Scheduled Cycle time period ($RCT_i$) and Consumed Scheduled cycle Time period ($CST_i$), respectively, and calculate the $I_{DFL}$ (Index of Dynamically Forward Loading).

The Intensity a of the DFL Index is the stage loading intensity.

Equation (1) is restated below for another symbol $N_i$ in place of $WIP_i$ which is a more efficient form of notation.

$$I_{DFL} = \frac{\sum_{i=1}^{n} N_i * RCT_i}{\sum_{i=1}^{n} N_i * CST_i} \quad (2)$$

Li=Lot "i"
i=1, 2 . . . n, where n is the number of the lot Li
$N_i$=wafer quantity of lot Li
$RCT_i$=Remaining scheduled Cycle Time for lot Li
$CST_i$=Consumed Scheduled Cycle Time for lot Li Referring to FIG. 1 again, the value of $I_{DFL}$ is being calculated for the stage "STkk" as follows:

$$I_{DFL}^{kk} = \frac{N_i * RCT_i}{N_i * CST_i} \quad (3)$$

In this case, as can be seen in FIG. 1, there is only one lot Li which is lot L1 since in this case "i"=1. Thus the formula above is as follows in this case.

$$I_{DFL}^{kk} = \frac{N_1 * RCT_1}{N_1 * CST_1} \quad (4)$$

$RCT_1$=Remaining scheduled cycle time for lot 1
$CST_1$=Consumed scheduled cycle time for lot 1
L1=Lot L1
$N_1$=Wafer quantity of lot L1 (No. of wafers in lot L1)

Referring to FIG. 2 again, equation (2) is rewritten for two lots L1 and L2.

kk Stage with Lots i=1 and 2

$$I_{DFL}^{kk} = \frac{\sum_{i=1}^{2} N_i * RCT_i}{\sum_{i=1}^{2} N_i * CST_i} \quad (5)$$

$$I_{DFL}^{kk} = \frac{(N_1 * RCT_1) + (N_2 * RCT_2)}{(N_1 * CST_1) + (N_2 * CST_2)} \quad (6)$$

Symbols $A_i$ and $B_i$ are defined as follows:
$A_i = RCT_i$ . . . Remaining scheduled Cycle Time for lot i
$B_i = CST_i$ . . . Consumed Scheduled cycle Time for lot i Now substitute symbols $A_i$ and $B_i$ into equation (6) yielding the result as follows:

$$I_{DFL}^{kk} = \frac{(N_1 * A_1) + (N_2 * A_2)}{(N_1 * B_1) + (N_2 * B_2)} \quad (7)$$

FIG. 4 shows a fabrication line with four stages STkk where kk=1, 2, 3 and 4. Stage ST1 is located near to the beginning of the line and stage ST4 is nearer to the end of the line QC. Lots L1, L2, L3, L4, L5, L6, L7, L8 and L9 are distributed along the line. As can be seen lots L1 and L2 have passed stage ST4 and are progressing towards end QC. Lot L3 is between stages ST3 and ST4. Lots L4, L5, L6 and L7 have passed stage ST2 and are progressing towards stage ST3. Lots L8 and L9 are between stages ST1 and stage ST2.

FIG. 5 shows the implementation of Dynamically Forward Loading Intensity to the fabrication line of FIG. 4 with the same arrangement of four stages ST1, ST2, ST3 and ST4 in the same locations as in FIG. 4 but with a different arrangement of the WIP which includes six lots L1, L2, L3, L4, L5, and L6. Equation 5 has been rewritten to provide the calculation of $I_{DFL}^2$ for stage ST2 which involves the lots Li, L2, L3, L4 which are at or between stage ST2 and end QC.

Referring to FIG. 5 once more, the stage STkk=ST2 is being studied for the lots L1, L2, L3, L4. Lot L1 has traveled 8.5 units and is 3.5 units from the end QC along the 12 unit track from Stage ST2 to end QC. Lot L2 has traveled 6 units and is 6 units from the end QC. Lot L3 has traveled 2.5 units and remains 9.5 units from the end QC. The parameters for stage ST2 are as follows:

TABLE I

|    | Lot L1    | Lot L2    | Lot L3   | Lot L4     |
|----|-----------|-----------|----------|------------|
| Ai | A1 = 3.5  | A2 = 6.0  | A3 = 9.5 | A4 = 11.0  |
| Bi | B1 = 8.5  | B2 = 6.0  | B3 = 2.5 | B4 = 1.0   |
| $N_i$ | $N_1$ = 20 | $N_2$ = 24 | $N_3$ = 6 | $N_4$ = 18 |

Equation (5) has been rewritten for four lots of work for a stage whose $I_{DFL}^{kk}$ is to be calculated as follows:

$$I_{DFL}^{kk} = \frac{(N_1 * A_1) + (N_2 * A_2) + (N_3 * A_3) + (N_4 * A_4)}{(N_1 * B_1) + (N_2 * B_2) + (N_3 * B_3) + (N_4 * B_4)} \quad (7)$$

Substituting the values above into the equation (7) for Stage 2 where kk=2, we have as follows:

$$I_{DFL}^2 = \frac{(20*3.5) + (24*6) + (6*9.5) + (18*11)}{(20*8.5) + (24*6) + (6*2.5) + (18*1.0)} \quad (8)$$

The result of the multiplication and division operations in equation (8) is as follows:

$$I_{DFL}^2 = \frac{70 + 144 + 36 + 198}{170 + 144 + 18 + 18} = \frac{448}{350} = 1.28 \quad (9)$$

$$I^3 = \frac{(N_1 * A_1) + (N_2 * A_2)}{(N_1 * B_1) + (N_2 * B_2)} \quad (10)$$

TABLE II

|  | Lot L1 | Lot L2 |
|---|---|---|
| Ai | A1 = 3.5 | A2 = 1.0 |
| Bi | B1 = 3.5 | B2 = 6.0 |
| $N_1$ | $N_1$ = 20 | $N_2$ = 24 |

$$I_{DFL}^3 = \frac{(20*3.5) + (24*1)}{(20*3.5) + (24*6)} \quad (11)$$

$$I_{DFL}^3 = \frac{(70) + (24)}{(70) + (144)} = \frac{94}{214} = .44 \quad (12)$$

$$I_{DFL}^{kk} = \frac{\begin{pmatrix} (N_1 * A_1) + (N_2 * A_2) + (N_3 * A_3) + \\ (N_4 * A_4) + (N_5 * A_5) + (N_6 * A_6) \end{pmatrix}}{\begin{pmatrix} (N_1 * B_1) + (N_2 * B_2) + (N_3 * B_3) + \\ (N_4 * B_4) + (N_5 * B_5) + (N_6 * B_6) \end{pmatrix}} \quad (13)$$

TABLE III

|  | Lot L1 | Lot L2 | Lot L3 | Lot L4 | Lot L5 | Lot L6 |
|---|---|---|---|---|---|---|
| Ai | A1 = 3.5 | A2 = 6.0 | A3 = 9.5 | A4 = 11.0 | A5 = 12.5 | A6 = 13.5 |
| Bi | B1 = 10.5 | B2 = 8.0 | B3 = 4.5 | B4 = 3.0 | B5 = 4.5 | B6 = 0.5 |
| $N_i$ | $N_1$ = 20 | $N_2$ = 24 | $N_3$ = 6 | $N_4$ = 18 | $N_5$ = 20 | $N_6$ = 6.0 |

$$I_{DFL}^2 = \frac{\begin{matrix}(20*3.5) + (24*6) + (6*9.5) + \\ (18*11) + (20*12.5) + (6*13.5)\end{matrix}}{\begin{matrix}(20*10.5) + (24*8) + (6*4.5) + \\ (18*3) + (20*4.5) + (6*6.0)\end{matrix}} \quad (14)$$

$$I_{DFL}^2 = \frac{70 + 144 + 57 + 198 + 250 + 81}{210 + 192 + 27 + 54 + 90 + 36} = \frac{800}{609} = 1.31 \quad (15)$$

Figure 6A:
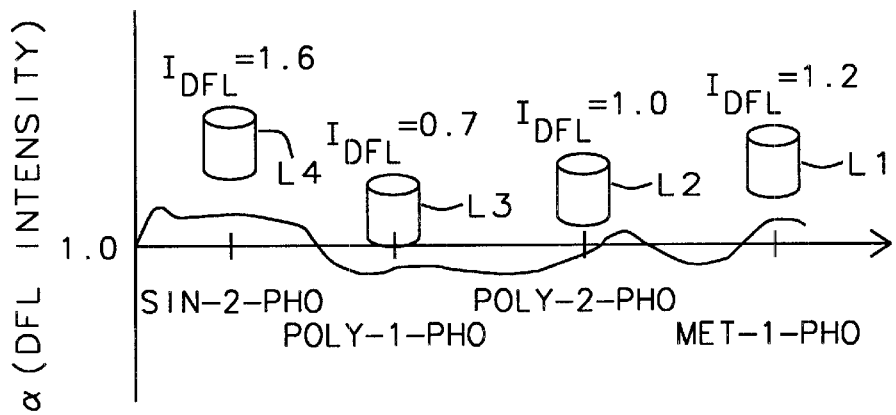
FIG. 6A shows a graph of α which is the values of $I_{DFL}$ for various stages plotted as a function of location along a production line for stages SIN-2-PHO, POLY-1-PHO, POLY-2-PHO, and MET-1-PHO.

FIG. 6A shows a graph of α which is the values of $I_{DFL}$ for various stages plotted as a function of location along a production line for stages SIN-2-PHO, POLY-1-PHO, POLY-2-PHO, and MET-1-PHO.

TABLE IV

| STAGE | SIN-2-PHO | POLY-1-PHO | POLY-2-PHO | MET-1-PHO |
|---|---|---|---|---|
| $I_{DFL}$ | 1.6 | 0.7 | 1.0 | 1.2 |

Dispatching Principle

The dispatching principle is that the greater the value of the Index $I_{DFL}$, the lower or later is the priority to be assigned to the lots passing from each of the stages in question. To the contrary, the lower the value of the Index $I_{DFL}$, the higher or earlier is the priority to be assigned to the lots passing from each of the stages in question.

Dispatching Order

The result of analysis of the curve in FIG. 6A is the appropriate new dispatching order which will adjust for the $I_{DFL}$ deviations from the desired values as follows:

POLY-1-PHO->POLY-2-PHO->MET-1-PHO->SIN-2-PHO

Figure 6B:
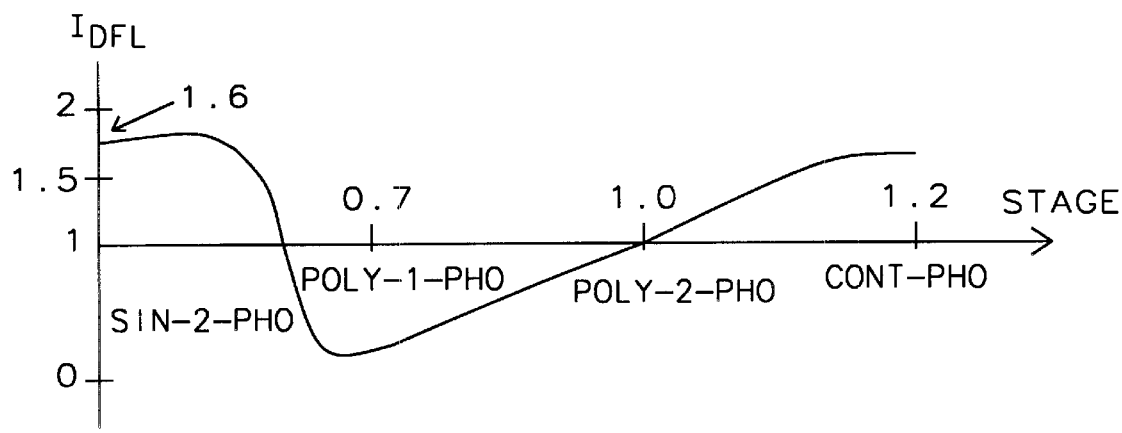
FIG. 6B shows a graph of $I_{DFL}$ another set of stages plotted as a function of location along a production line for stages SIN-2-PHO, POLY-1-PHO, POLY-2-PHO, and CONT-PHO.

FIG. 6B shows a graph of $I_{DFL}$ another set of stages plotted as a function of location along a production line for stages SIN-2-PHO, POLY-1-PHO, POLY-2-PHO, and CONT-PHO.

TABLE V

| STAGE | SIN-2-PHO | POLY-1-PHO | POLY-2-PHO | CONT-PHO |
|---|---|---|---|---|
| $I_{DFL}$ | 1.6 | 0.7 | 1.0 | 1.2 |

Dispatching Order

The result of analysis of the curve in FIG. 6B is the appropriate new dispatching order which will adjust for the $I_{DFL}$ deviations from the desired values as follows:

POLY-1-PHO->POLY-2-PHO->CONT-PHO->SIN-2-PHO

Figure 7:
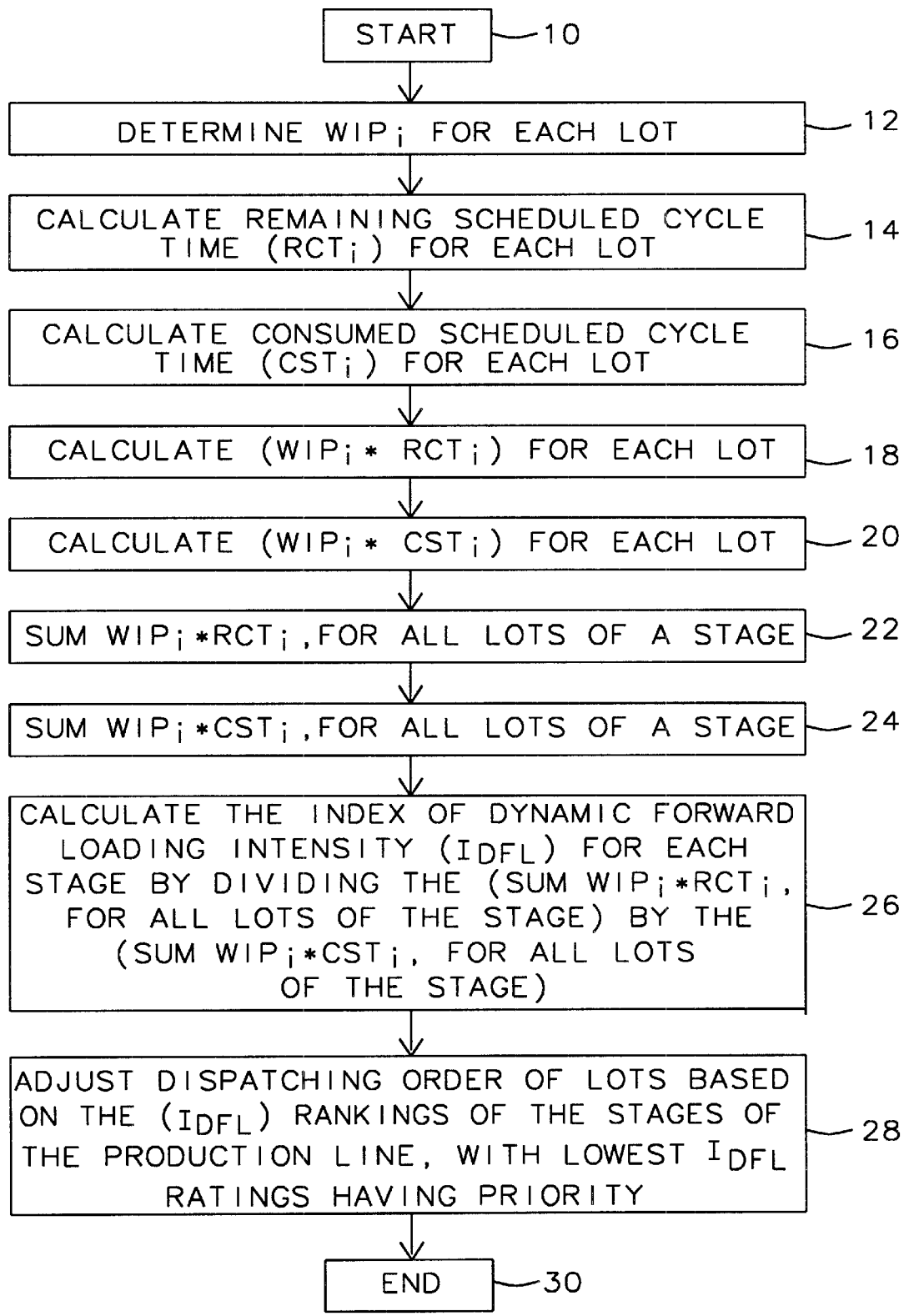
FIG. 7 is a flow chart of a system provided in the computer control system of FIG. 8.
Figure 8:
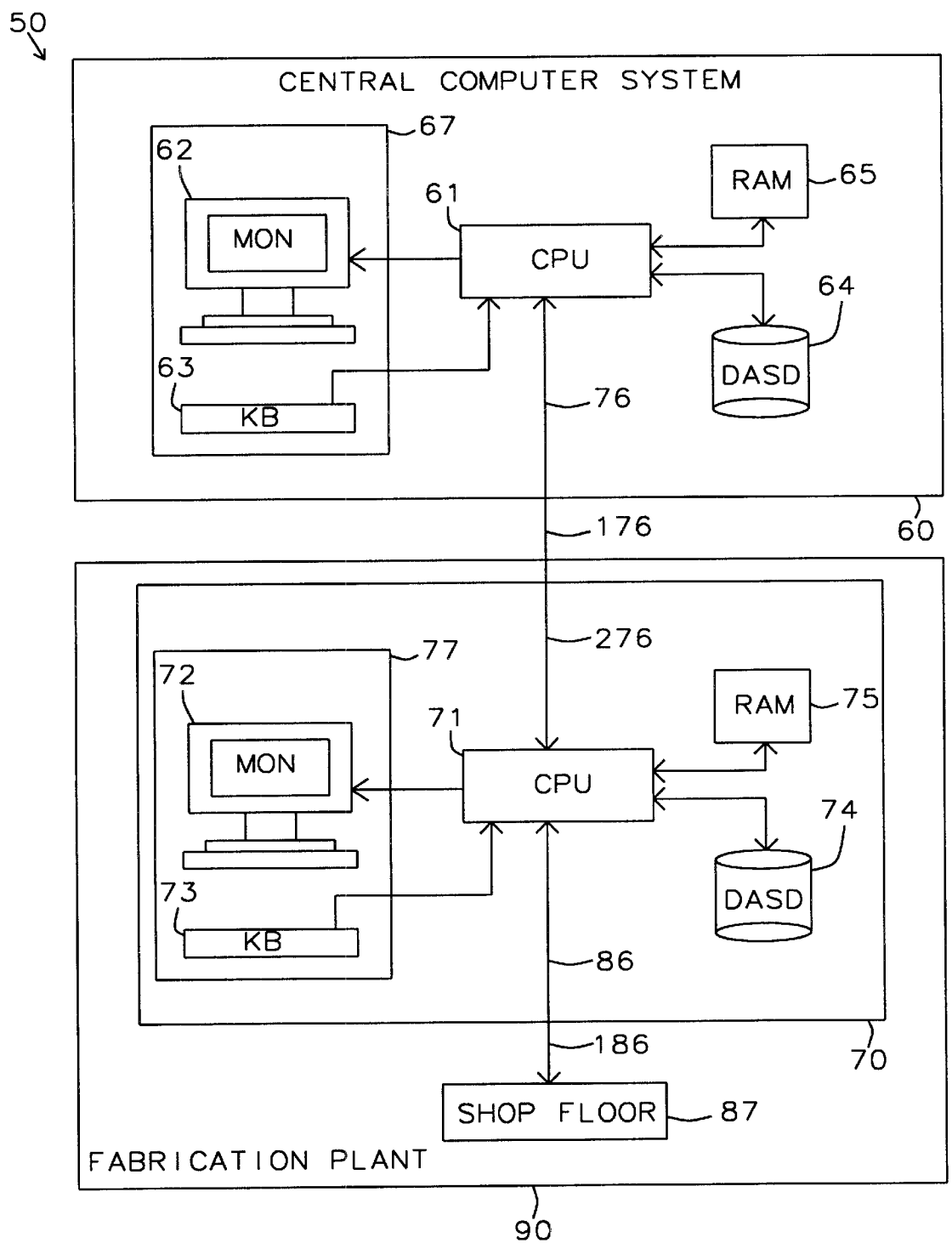
FIG. 8 shows a manufacturing plant which includes a central computer system and a fabrication plant with a shop floor where products, such as semiconductor chips, are being manufactured and a computer system for allocating fabrication plant resources in accordance with this invention.

Referring to FIG. 7 a flow chart of a system provided in the computer control system of FIG. 8 is shown.

In step 10, the computer system of FIG. 8 STARTs the process of calculating $I_{DFL}$ values in accordance with the above equations.

In step 12, the computer system calculates ($WIP_i$) for each lot Li on the production line.

In step 14, the computer system calculates the remaining scheduled cycle time $CST_i$) for each lot Li.

In step 16, the computer system calculates the consumed scheduled cycle time ($CST_i$) for each lot Li.

In step 18, the computer system calculates the ($WIP_i*RCT_i$) for each lot Li.

In step 20, the computer system calculates the ($WIP*CST_i$) for each lot Li.

In step 22, the computer system Sums $WIP_i*RCT_i$ for all lots Li of a stage.

In step 24, the computer system Sums $WIP_i*CST$ for all lots Li of a stage.

In step 26, the computer system calculates the Index of Dynamic Forward Loading Intensity ($I_{DFL}$) for each stage by dividing the (Sum $WIP_i*RCT_i$, for all lots Li associated with the particular stage $ST^{kk}$ by the (Sum $WIP_i*CST_i$, for all lots Li associated with the stage $ST^{kk}$).

Finally in step 28, the computer system adjusts the dispatching order of lots Li based on the rankings all of the stages ST$^{kk}$ of the production I$_{DFL}$ line, with lowest I$_{DFL}$ ratings having priority. At step 30, the program ENDs.

FIG. 8 shows a manufacturing plant 50 which includes a central computer system 60 and a fabrication plant 90 with a shop floor 87 where products, such as semiconductor chips, are being manufactured and a computer system 70 for allocating fabrication plant resources in accordance with this invention.

The computer program in accordance with this invention is preferably resident in a site in the fabrication plant computer system 70 which is preferably connected, as shown in FIG. 8, as a part of the overall computer system with the central computer system 60, which is an alternative site for the computer program of this invention.

Referring again to FIG. 8, the computer system 70 operates as an integral part of the fabrication plant 90 and so it is shown located within the plant 90, but it may be located elsewhere, as will be obvious to those skilled in the art and it can be a portion of an overall consolidated system incorporating the central computer system 60 and can operate independently as a matter of choice.

The central computer system 60 shown in FIG. 8 comprises a CPU (Central Processing Unit) 61, a terminal 67 with a monitor 62 connected to the CPU 61 for receiving data from the CPU 61 and a keyboard 63 connected to the CPU 61 for sending data respectively to the CPU 61. A RAM (Random Access Memory) 65 and a DASD 64 associated with the CPU 61 are shown connected for bidirectional communication of data to and from CPU 61.

Lines 76, 176 and 276 provide for interconnections between the CPU 61 of system 60 to the CPU 71 of the fabrication plant computer system 70. Line 176 connects between lines 76 and 276 at the interfaces of computer 60 and a factory control computer system 70 respectively.

The factory control computer system 70 comprises a CPU 71, a terminal 77 with monitor 72 connected to the CPU 71 for receiving data respectively from the CPU 71 and keyboard 73 connected to the CPU 71 for sending data respectively to the CPU 71. A random access memory 75 and a DASD 74 associated with the CPU 71 are shown connected for bidirectional communication of data to and from CPU 71. Line 86 connects from CPU 71 to line 186 connects through the factory control computer 70 interface to the shop floor system 87. A layout viewer may be connected to the CPU 71 to display error flags generated by the pattern for used by the operator of the computer system 70.

The system 50 includes the data defining the scanning of the steppers for the plant 90 stored in one of the DASD unit 64, DASD unit 74 RAM 65 or RAM 75, as desired, in a conventional manner, as will be well understood by those skilled in the art.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

Having thus described the invention, what is claimed as new and desirable to be secured by Letters Patent is as follows:

1. A method for determining an Index of Dynamic Forward Loading (I$_{DFL}$) for a stage on a production line comprising:

calculate a Work In Process$_i$ (WIP$_i$) for a stage ST$^{kk}$ for each lot Li in a queue of lots being processed in a production line between said stage ST$^{kk}$ and end point, where "i" is a positive integer representing the position of said lot Li in said queue, and where "kk" is a positive integer indicating the sequential position of the stage ST$^{kk}$ in a location along said production line from the beginning to the end of a predetermined portion of said production line, calculate remaining scheduled cycle time (RCT$_i$) for each lot Li, calculate consumed scheduled cycle time (CST$_i$) for each lot Li, calculate WIP$_i$*RCT$_i$ for each lot Li, calculate WIP$_i$*CST$_i$ for each lot Li, summing WIP$_i$*RCT$_i$ for all lots Li of a stage, summing WIP$_i$*CST$_i$ for all lots Li of a stage, calculate an Index of Dynamic Forward Loading (I$_{DFL}$) Intensity for each stage ST$^{kk}$ by dividing the Sum WIP$_i$*RCT$_i$, for all lots of the stage ST$^{kk}$, by the Sum WIP$_i$*CST$_i$, for all lots of the stage ST$^{kk}$, where kk is a positive integer indicating the location of the stage from the beginning to the end of said production line, and adjust dispatching order of lots based on I$_{DFL}$ Intensity of all stages of the production line, with lowest I$_{DFL}$ Intensity having priority.

2. A method in accordance with claim 1 including determining I$_{DFL}$ in accordance with the equation as follows:

$$I_{DFL} = \frac{\sum_{i=1}^{n} N_i * RCT_i}{\sum_{i=1}^{n} N_i * CST_i}$$

Li=Lot "i"

i=1, 2 . . . n, where n is the number of the lot Li

N$_i$=wafer quantity of lot Li

RCT$_i$=Remaining scheduled Cycle Time for lot Li

CST$_i$=Consumed Scheduled Cycle Time for lot Li.

3. A method in accordance with claim 1 including determining I$_{DFL}$ for two lots Li in accordance with the equations as follows:

$$I_{DFL}^{kk} = \frac{\sum_{i=1}^{2} N_i * RCT_i}{\sum_{i=1}^{2} N_i * CST_i} \tag{5}$$

$$I_{DFL}^{kk} = \frac{(N_1 * RCT_1) + (N_2 * RCT_2)}{(N_1 * CST_1) + (N_2 * CST_2)}. \tag{6}$$

4. A system for determining an Index of Dynamic Forward Loading Intensity (I$_{DFL}$) for a stage on a production line comprising:

means for calculating a Work in Process (WIP$_i$) for a stage ST$^{kk}$ for each lot Li in a queue of lots being processed in a production line between said stage ST$^{kk}$ and end point, where "i" is a positive integer representing the position of said lot Li in said queue, and where "kk" is a positive integer indicating the sequential position of the stage ST$^{kk}$ location along said production line from the beginning to the end of a predetermined portion of said production line, means for calculating the remaining scheduled cycle time ($RCT_i$) for each lot Li, means for calculating consumed scheduled cycle time ($CST_i$) for each lot Li, means for calculating $WIP_i * RCT_i$ for each lot Li, means for calculating $WIP_i * CST_i$ for each lot Li, means for summing $WIP_i * RCT_i$ for all lots Li of a stage means for summing $WIP_i * CST_i$ for all lots Li of a stage, means for calculating an Index of Dynamic Forward Loading ($I_{DFL}$) Intensity for each stage $ST^{kk}$ by dividing the Sum $WIP_i * RCT_i$, for all lots of the stage $ST^{kk}$ by the Sum $WIP_i * CST_i$, for all lots of the stage $ST^{kk}$, where kk is a positive integer indicating the location of the stage from the beginning to the end of said production line, and means for adjusting dispatching order of lots based on $I_{DFL}$ Intensity of all stages of the production lines with lowest $I_{DFL}$ Intensity having priority.

5. A system in accordance with claim 4 including determining $I_{DFL}$ in accordance with the equation as follows:

$$I_{DFL} = \frac{\sum_{i=1}^{n} N_i * RCT_i}{\sum_{i=1}^{n} N_i * CST_i} \quad (4)$$

Li=Lot "i"

i=1, 2 ... n, where n is the number of the lot Li $N_i$=wafer quantity of lot Li $RCT_i$=Remaining scheduled Cycle Time for lot Li $CST_i$=Consumed Scheduled Cycle Time for lot Li.

6. A system in accordance with claim 4 including determining $I_{DFL}$ for two lots Li in accordance with the equations as follows:

$$I_{DFL}^{kk} = \frac{\sum_{i=1}^{2} N_i * RCT_i}{\sum_{i=1}^{2} N_i * CST_i} \quad (5)$$

$$I_{DFL}^{kk} = \frac{(N_1 * RCT_1) + (N_2 * RCT_2)}{(N_1 * CST_1) + (N_2 * CST_2)} \quad (6)$$

7. A method for determining a rate of dispatching lots for a stage on a production line comprising:

determining a weighted loading of work for each of said lots between said stage and a succeeding location on said production line by calculating a ratio of weighted progress of said lots as a product of time from dispatching of each lot and as a product of time to completion for each lot to produce an Index of weighted progress for said stage, and adjusting the rate of dispatching of said lots as a function of said Index.

* * * * *